UNITED STATES PATENT OFFICE.

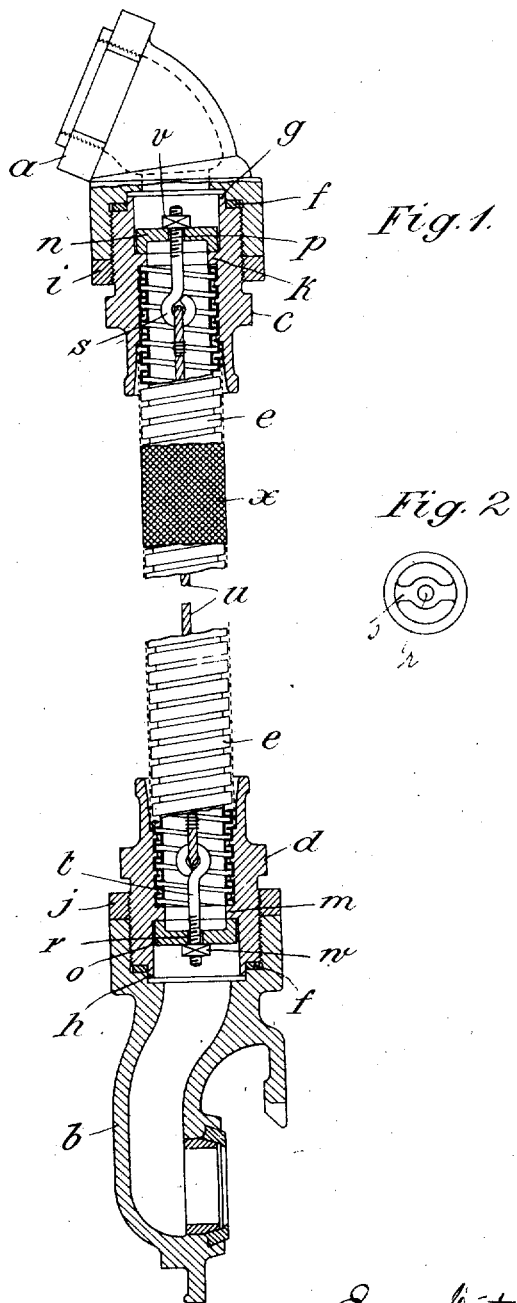

EMIL WITZENMANN, OF PFORZHEIM, GERMANY.

HOSE.

973,901.     Specification of Letters Patent.     Patented Oct. 25, 1910.

Application filed October 26, 1907. Serial No. 399,290.

*To all whom it may concern:*

Be it known that I, EMIL WITZENMANN, manufacturer, a subject of the Grand Duke of Baden, residing at No. 48 Holzgartenstrasse, Pforzheim, German Empire, have invented new and useful Improvements in Hose, of which the following is a specification.

My invention relates to hose of that class in which the strain is taken up by a rope or some equivalent means connecting the end-pieces of the hose.

The essential feature of my invention consists in a novel means for effecting the connection between the rope and the end-pieces, whereby extreme simplicity is attained.

In the accompanying drawing my invention is shown applied to a hose such as is employed for the brake- and heating-pipes of railroad cars.

Figure 1 is a longitudinal section through the terminal portions of a hose with coupling members. Fig. 2 shows a detail to be hereinafter referred to.

$a$, $b$ are the usual coupling-pieces, into which the end-pieces $c$, $d$ of the hose $e$ are screwed. The hose here shown by way of example is a so-called metallic spiral hose, that is to say, a flexible pipe consisting of a metal tape of suitable cross section wound upon itself. The joints between the parts $a$, $c$ and $b$, $d$ respectively are made with the aid of gaskets $f$, $f$. The latter are quite shut in by the provision of a lip $g$, $h$ on the parts $c$, $d$ respectively, so that it is impossible for fragments of the packing material to get torn off and drawn along by the pressure agent. To prevent accidental loosening of the parts $a$, $c$ and $b$, $d$ lock-nuts $i$, $j$ are employed.

The end-pieces $c$, $d$ of the hose $e$ are each furnished with an annular internal rib $k$, $m$ against which bear the cross- or bridge-pieces $n$, $o$, one of which is shown separately in Fig. 2. The pieces $n$, $o$ are provided with central apertures $p$, $r$ through which there pass the threaded eye-bolts $s$, $t$, to which the ends of a suitable ligament as a rope $u$ are attached. The eye-bolts are retained by small nuts $v$, $w$.

Since the end-pieces $c$, $d$ are connected by the rope $u$, it is obvious that the hose $e$ is relieved of all strain, which is transmitted wholly to the parts $c$, $d$. In this manner all danger of the mutually engaging coils of the metallic hose being torn asunder is effectively obviated, and the durability of the hose thus greatly augmented. It will also be observed that the procedure of connecting the rope to the bridges $n$, $o$ is exceedingly simple.

The metal hose $e$ may, if desired, receive an external covering to protect it from possible injury. In the particular construction illustrated, the hose is sheathed with wire gauze $x$. The latter may receive a further covering of wirework and may also be armored with spirally wound wire or with a second metallic hose.

Having thus described my invention, what I claim as new is:—

1. In combination, flexible spirally wound metallic tubing, connecting pieces at the ends thereof presenting projections, cross pieces movable within said connecting pieces and bearing against said projections, said cross pieces forming loose bridges movable within the connecting pieces and having central apertures, adjustable means passed through said apertures and flexible means connecting said adjustable means and extending through said connecting pieces and the metallic tubing.

2. In combination, flexible spirally wound metallic tubing, coupling pieces, end pieces screwed thereinto and having projecting lips, gaskets surrounding said lips, lock nuts for said coupling pieces and end pieces, said end pieces having annular internal ribs, bridge pieces bearing against said ribs and loosely inclosed within the end pieces, means adjustably held in said bridge pieces and extended toward each other, and flexible means joining the adjacent ends of said adjustable means and disposed within the metallic tubing.

In witness whereof I have hereunto signed my name this 10th day of October 1907, in the presence of two subscribing witnesses.

EMIL WITZENMANN.

Witnesses:
B. WITZENMANN,
ERNEST ENTEMANN.